(12) United States Patent
Gurumurthi et al.

(10) Patent No.: US 12,216,539 B2
(45) Date of Patent: Feb. 4, 2025

(54) PAGE RETIREMENT TECHNIQUES FOR MULTI-PAGE DRAM FAULTS

(71) Applicant: ADVANCED MICRO DEVICES, INC., Santa Clara, CA (US)

(72) Inventors: Sudhanva Gurumurthi, Austin, TX (US); Vilas Sridharan, Boston, MA (US); Majed Valad Beigi, Burlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/977,001

(22) Filed: Oct. 31, 2022

(65) Prior Publication Data

US 2024/0143440 A1  May 2, 2024

(51) Int. Cl.
*G06F 11/30* (2006.01)
*G06F 11/07* (2006.01)
*G06F 11/10* (2006.01)
*G06F 12/1027* (2016.01)

(52) U.S. Cl.
CPC ...... *G06F 11/1068* (2013.01); *G06F 11/0793* (2013.01); *G06F 12/1027* (2013.01)

(58) Field of Classification Search
None
See application file for complete search history.

(56) References Cited

U.S. PATENT DOCUMENTS

| | | | |
|---|---|---|---|
| 9,274,882 B2 * | 3/2016 | Camp | G06F 3/064 |
| 9,417,809 B1 * | 8/2016 | Camp | G06F 11/108 |
| 2013/0058145 A1 * | 3/2013 | Yu | G11C 29/783 |
| | | | 365/201 |
| 2015/0046651 A1 * | 2/2015 | Luttrell | G06F 12/0811 |
| | | | 711/122 |
| 2015/0278011 A1 | 10/2015 | Keppel et al. | |
| 2016/0378396 A1 * | 12/2016 | Ramanujan | G06F 12/0866 |
| | | | 711/105 |
| 2017/0160960 A1 * | 6/2017 | Camp | G06F 3/0689 |
| 2019/0065331 A1 * | 2/2019 | Singidi | G11C 29/883 |
| 2019/0163557 A1 | 5/2019 | Nguyen et al. | |
| 2020/0065203 A1 | 2/2020 | Nguyen et al. | |
| 2020/0133517 A1 * | 4/2020 | Shah | G06F 11/076 |
| 2020/0210108 A1 | 7/2020 | Palmer | |
| 2021/0042183 A1 | 2/2021 | Adamski | |
| 2021/0200621 A1 * | 7/2021 | Aklik | G06F 11/0727 |
| 2021/0200622 A1 * | 7/2021 | Aklik | G06F 11/0727 |

(Continued)

OTHER PUBLICATIONS

International Search Report and Written Opinion issued in Application No. PCT/US2023/036102, mailed Feb. 23, 2024, 10 pages.

*Primary Examiner* — Mujtaba M Chaudry

(57) ABSTRACT

A processing system employs techniques for enhancing dynamic random access memory (DRAM) page retirement to facilitate identification and retirement of pages affected by multi-page DRAM faults. In response to detecting an uncorrectable error at a first page of DRAM, the processing system identifies a second page of the DRAM for potential retirement based on one or more of physical proximity to the first page, inclusion in a range of addresses stored at a fault map that tracks addresses of DRAM pages having detected faults, and predicting a set of pages to check for faults based on misses at a translation lookaside buffer (TLB).

20 Claims, 9 Drawing Sheets

(56) References Cited

U.S. PATENT DOCUMENTS

2021/0200623 A1\* 7/2021 Aklik .................. G06F 11/1068
2021/0209031 A1\* 7/2021 Truelove ............. G06F 12/1027
2022/0358042 A1\* 11/2022 Malladi ............... G06F 12/0828

\* cited by examiner

PAGE RETIREMENT TECHNIQUES FOR MULTI-PAGE DRAM FAULTS

BACKGROUND

Computer memories such as dynamic random access memory (DRAM) are susceptible to a variety of transient and permanent faults. Transient faults cause incorrect data to be read from a memory location until the location is overwritten with correct data and are not indicative of device damage, whereas permanent faults (i.e., hard faults) cause a memory location to consistently return an incorrect value. In response to encountering a permanent fault, referred to as a detectable uncorrectable error (DUE), a processing system retires the affected portion of memory.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
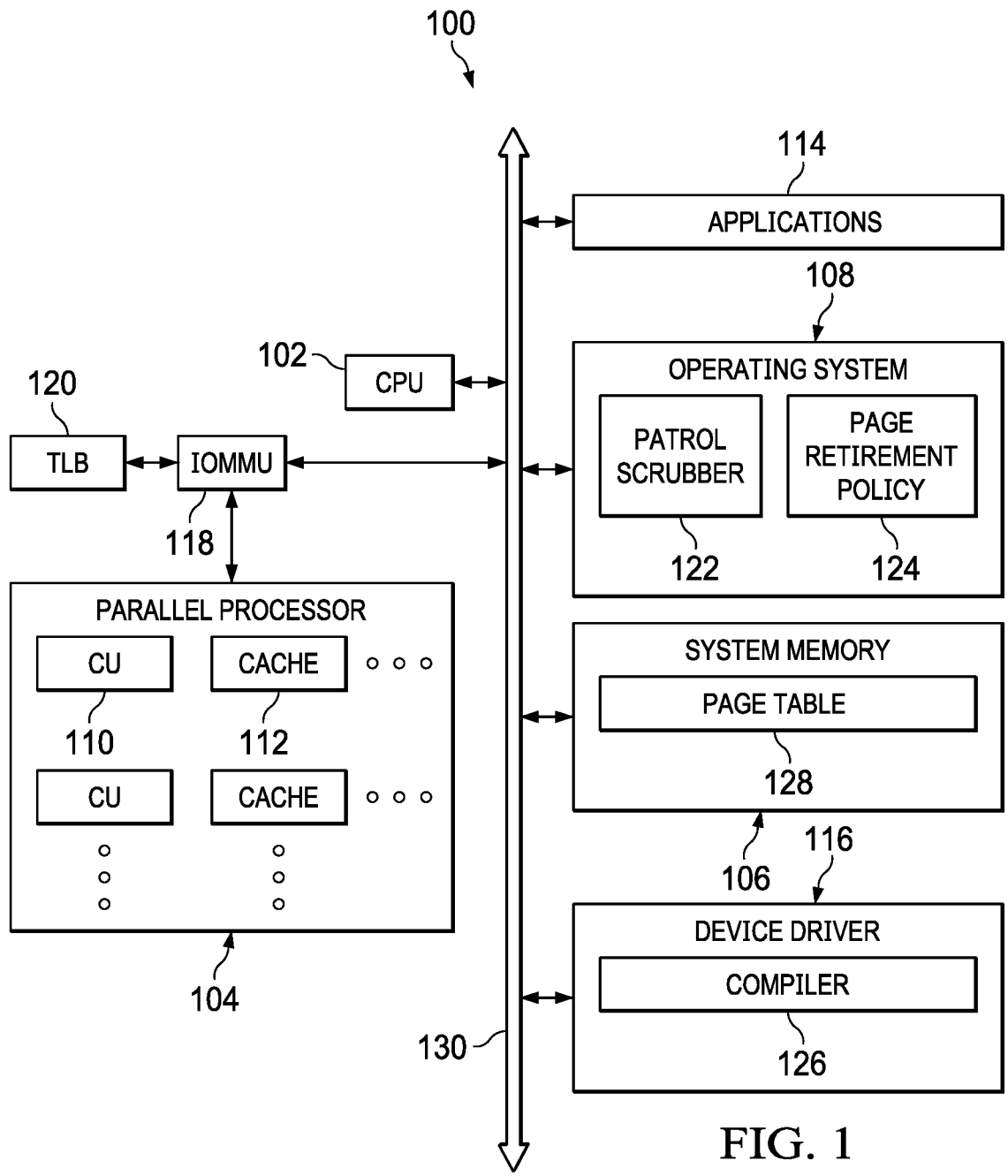
FIG. 1 is a block diagram of a processing system configured to implement a page retirement policy to preemptively identify pages of memory for retirement based on detected faults in other pages of memory in accordance with some embodiments.

Conventional processing systems generally employ one or more memory modules (e.g., industry standard memory such as Dual Inline Memory Modules (DIMMs)) having an array of memory cells. DIMMS are composed of rows of DRAM chips, which in turn are organized in banks of row and columns of memory cells configured to store data. Conventional retirement algorithms retire portions of memory affected by DUES at a level of granularity of a single page (i.e., 4 kilobytes), which typically maps to a single DRAM row. A page is a fixed-length contiguous block of virtual memory, described by a single entry in a page table. A memory page is the smallest unit of data for memory management in a virtual memory operating system.

However, larger granularity faults in DRAM potentially impact multiple rows or an entire DRAM bank. Based on how data is interleaved in the memory system, a single page retirement action (whether initiated in response to a DUE or on patterns of corrected errors) typically retires a single row or a part of a DRAM row. Therefore, a DUE that spans multiple pages of memory, such as a multi-bit fault in high bandwidth memory (HBM2/2E) or an unbounded fault in HBM3, may require multiple invocations of a driver of the processing system to initiate page retirement, negatively impacting system availability and performance.

Processing systems often use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of pages of memory. Thus, to support memory accesses, the processing system typically employs address translation circuitry to translate the virtual addresses to corresponding physical addresses. The address translation circuitry employs one or more translation lookaside buffers (TLBs) to cache virtual-to-physical address translations for efficient lookup by processor cores.

FIGS. 1-11 illustrate techniques for enhancing DRAM page retirement in a processing system to facilitate identification and retirement of pages affected by multi-page DRAM faults. In response to detecting an uncorrectable error at a first page of DRAM, the processing system identifies one or more additional pages (also referred to herein collectively as "a second page") of the DRAM for potential retirement based on one or more of physical proximity to the first page, inclusion in a range of addresses stored at a fault map that tracks addresses of DRAM pages having detected faults, and predicting a set of pages to check for faults based on misses at a TLB. By identifying additional pages of DRAM for potential retirement based on a DUE at the first page, the processing system preemptively retires pages affected by a multi-page fault and reduces invocations of the driver to initiate page retirement.

In some embodiments, the processing system employs a page retirement policy that specifies that in response to encountering a DUE at a first page of DRAM, the processing system scrubs (i.e., checks for errors at) a subset of pages that are within a predetermined physical distance from the first page for the presence of a large (multi-page) fault. The predetermined physical distance is set based on the page retirement policy. If the processing system encounters a fault at the subset of pages, the processing system retires the subset of pages.

In other embodiments, the processing system employs a page retirement policy that specifies that in response to encountering a DUE at the first page of DRAM, the processing system adds the address of the page having the DUE to a fault map maintained by a patrol scrubber. The patrol scrubber scans the DRAM at intervals for faults and lists the addresses of page faults at the fault map. The processing system determines if the address of the first page falls within a set of pages identified to fall within a large fault in the fault map. If the address of the first page is within the range of addresses of a large fault, the processing system retires all the pages within the range.

In some embodiments, the processing system employs a page retirement policy that identifies pages for scrubbing based on misses at a TLB. A TLB miss is predictive of a miss at a cache which will necessitate a memory access. If the patrol scrubber encounters a DUE at a page that is included in a subset of adjacent pages that are predicted to miss at the cache (referred to herein as a "miss set"), the processing system retires the entire subset of adjacent pages. In some embodiments, the processing system identifies the miss set as pages that have the same set index and offset bit values. In response to a miss at the TLB, the processing system uses a hash function to decode the page offset of the virtual address of the TLB miss and returns the index of the set. The processing system inserts the set number into a table to track sets referred by TLB misses. When the number of misses to a set exceeds a threshold, the patrol scrubber scrubs (i.e., reads and checks for errors within) the pages of the set to identify any DUEs within the set.

FIG. 1 is a block diagram of a processing system configured to implement a page retirement policy to preemptively identify pages of memory for retirement based on detected faults in other pages of memory in accordance with some embodiments. The processing system 100 includes a central processing unit (CPU) 102 and a parallel processing unit (PPU) 104, also referred to herein as parallel processor 104. In various embodiments, the CPU 102 includes one or more single- or multi-core CPUs. In various embodiments, the parallel processor 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. In the embodiment of FIG. 1, the processing system 100 is formed on a single silicon die or package that combines the CPU 102 and the parallel processor 104 to provide a unified programming and execution environment. This environment enables the parallel processor 104 to be used as fluidly as the CPU 102 for some programming tasks. In other embodiments, the CPU 102 and the parallel processor 104 are formed separately and mounted on the same or different substrates. It should be appreciated that processing system 100 may include one or more software, hardware, and firmware components in addition to or different from those shown in FIG. 1. For example, processing system 100 may additionally include one or more input interfaces, non-volatile storage, one or more output interfaces, network interfaces, and one or more displays or display interfaces. The processing system 100 includes, for example, a server, a desktop computer, laptop computer, tablet computer, mobile phone, gaming console, and the like.

As illustrated in FIG. 1, the processing system 100 also includes a system memory 106, an operating system 108, a communications infrastructure 130, and one or more applications 114. Access to system memory 106 is managed by a memory controller (not shown), which is coupled to system memory 106. For example, requests from the CPU 102 or other devices for reading from or for writing to system memory 106 are managed by the memory controller. In some embodiments, the one or more applications 114 include various programs or commands to perform computations that are also executed at the CPU 102. The CPU 102 sends selected commands for processing at the parallel processor 104. The operating system 108 and the communications infrastructure 130 are discussed in greater detail below. The processing system 100 further includes a device driver 116 and a memory management unit, such as an input/output memory management unit (IOMMU) 118. Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, in various embodiments, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some embodiments, other software commands (e.g., device driver 116) also reside in system memory 106 during execution of processing system 100.

The system memory 106 includes a page table 128, which maintains a record of page table entries storing virtual address to physical address translation information for pages of data that are stored in the system memory. Upon receiving a request from a program to access memory at a given virtual address, the CPU 102 or parallel processor 104 performs a page table walk to acquire corresponding physical address information from the page table 128 for a page table entry that provides the physical address associated with the virtual address.

The IOMMU 118 is a multi-context memory management unit. As used herein, context is considered the environment within which kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 118 includes logic to perform virtual to physical address translation for memory page access for devices, such as the parallel processor 104. In some embodiments, the IOMMU 118 also includes, or has access to, a translation lookaside buffer (TLB) 120. The TLB 120, as an example, is implemented in a content addressable memory (CAM) to accelerate translation of logical (i.e., virtual) memory addresses to physical memory addresses for requests made by the parallel processor 104 for data in system memory 106. The TLB 120 stores a subset of the virtual address to physical address information stored at the page table 128. In some embodiments, the TLB 120 is implemented as a hierarchy of multiple TLBs.

In various embodiments, the communications infrastructure 130 interconnects the components of processing system 100. Communications infrastructure 130 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 130 also includes an Ethernet network or any other suitable physical communications infrastructure that satisfies an application's data transfer rate requirements. Communications infrastructure 130 also includes the functionality to interconnect components, including components of processing system 100.

A driver, such as device driver 116, communicates with a device (e.g., parallel processor 104) through an interconnect or the communications infrastructure 130. When a calling program invokes a routine in the device driver 116, the device driver 116 issues commands to the device. Once the device sends data back to the device driver 116, the device driver 116 invokes routines in an original calling program. In general, device drivers are hardware-dependent and operating-system-specific to provide interrupt handling required for any necessary asynchronous time-dependent hardware interface. In some embodiments, a compiler 126 is embedded within device driver 116. The compiler 126 compiles source code into program instructions as needed for execution by the processing system 100. During such compilation, the compiler 126 applies transforms to program instructions at various phases of compilation. In other embodiments, the compiler 126 is a stand-alone application. In various embodiments, the device driver 116 controls operation of the parallel processor 104 by, for example, providing an application programming interface (API) to software (e.g., applications 114) executing at the CPU 102 to access various functionality of the parallel processor 104.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 114, and the device driver 116. In some embodiments, the CPU 102 initiates and controls the execution of the one or more applications 114 by distributing the processing associated with one or more applications 114 across the CPU 102 and other processing resources, such as the parallel processor 104.

The parallel processor 104 executes commands and programs for selected functions, such as graphics operations and other operations that may be particularly suited for parallel processing. The parallel processor 104 is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). In general, parallel processor 104 is frequently used for executing graphics pipeline operations, such as pixel operations, geometric computations, and rendering an image to a display. In some embodiments, parallel processor 104 also executes compute processing operations (e.g., those operations unrelated to graphics such as video operations, physics simulations, computational fluid dynamics, etc.), based on commands received from the CPU 102. A command can be executed by a special processor, such a dispatch processor, command processor, or network controller.

In various embodiments, the parallel processor 104 includes one or more compute units 110 that are processor cores that include one or more SIMD units (not shown) that execute a thread concurrently with execution of other threads in a wavefront, e.g., according to a single-instruction, multiple-data (SIMD) execution model. The SIMD execution model is one in which multiple processing elements such as arithmetic logic units (ALUs) share a single program control flow unit and program counter and thus execute the same program but are able to execute that program with different data. Some embodiments of the parallel processor 104 are used to implement a GPU and, in that case, the compute units 110 are referred to as shader cores or streaming multi-processors (SMXs). The number of compute units 110 that are implemented in the parallel processor 104 is a matter of design choice. An application 114 executing at one or more of the compute units 110 is referred to as a software client.

The parallel processor 104 also includes one or more caches 112 configured to store subsets of data stored at the system memory 106. If data required by the parallel processor 104 is not found at the cache 112, a cache controller (not shown) issues a memory access request to a memory controller (not shown) to retrieve the data from the system memory 106.

To facilitate retirement of memory pages in response to faults spanning more than one memory page, the processing system 100 includes a patrol scrubber 122 and a page retirement policy 124. The patrol scrubber 122 is a hardware scrubber in some embodiments that periodically "scrubs" the system memory 106 by reading every location in system memory 106 and corrects latent (unaccessed) correctable errors before a second failure creates an uncorrectable error. In other embodiments, the patrol scrubber 122 is implemented in software and is included in, e.g., the operating system 108 or the device driver 116. The patrol scrubber 122 corrects the correctable errors, such as single-bit errors, using error correction codes (ECCs). The time that the patrol scrubber 122 takes to cycle through every location in the system memory 106 is referred to as the scrub interval. In the course of scrubbing the system memory 106, the patrol scrubber 122 also encounters DUEs, such as multi-bit errors. For DUEs, the patrol scrubber 122 generates a list of pages to be retired to isolate the uncorrected memory errors.

The page retirement policy 124 preemptively (i.e., outside of a scrub interval or pursuant to a memory access) identifies additional pages of DRAM for potential retirement in response to detecting an uncorrectable error at a first page of DRAM. The page retirement policy 124 specifies identification of a second page of the DRAM for potential retirement based on one or more of physical proximity to the first page, inclusion in a range of addresses stored at a fault map that tracks addresses of DRAM pages having detected faults, and predicting a set of pages to scrub based on misses at the TLB 120.

Figure 2:
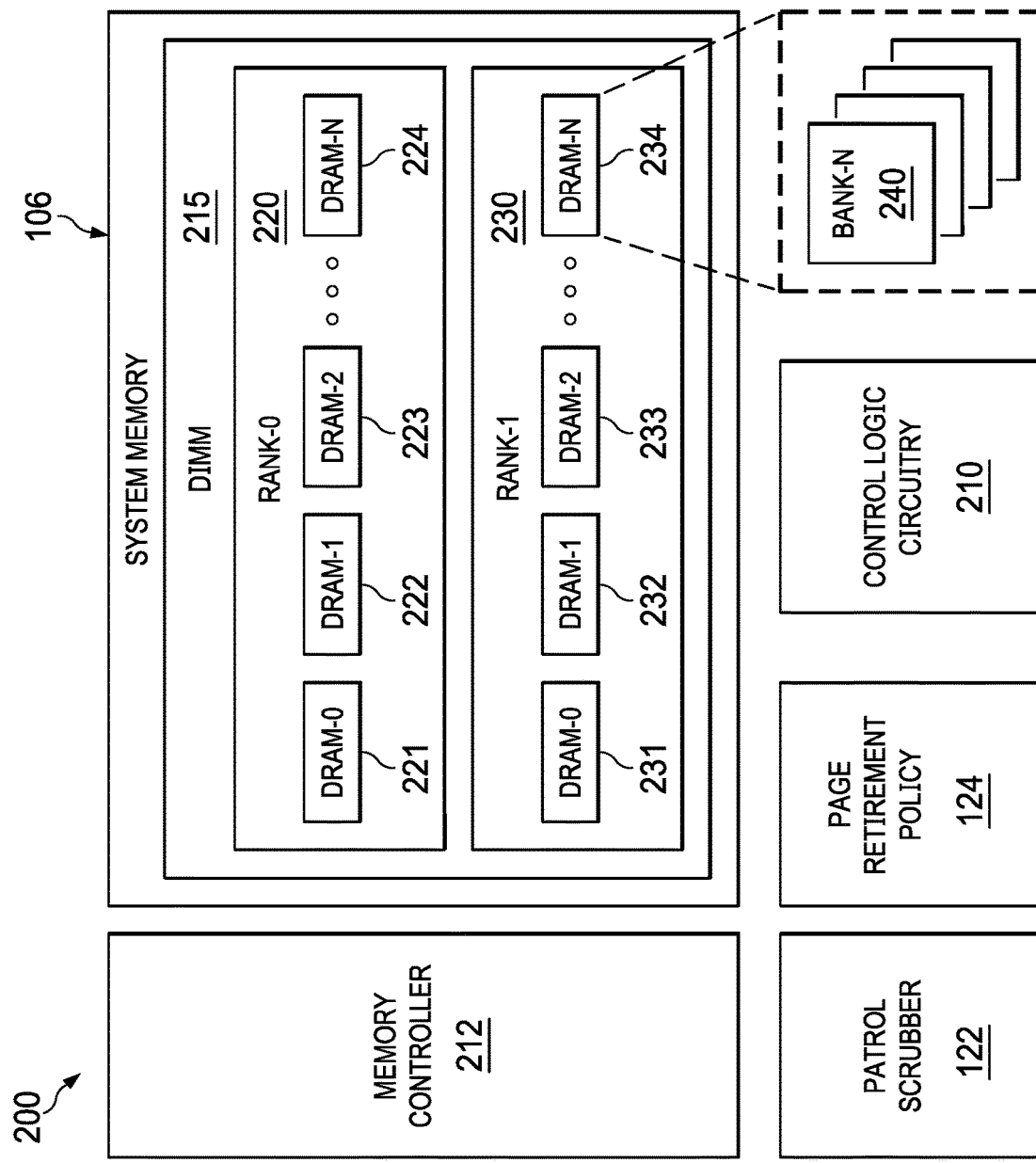
FIG. 2 is a block diagram of control logic circuitry configured to implement a page retirement policy in conjunction with a patrol scrubber at a system memory of a processing system in accordance with some embodiments.

FIG. 2 is a block diagram of a memory subsystem 200 including control logic circuitry 210 configured to implement the page retirement policy 124 in conjunction with the patrol scrubber 122 at the system memory 106 of the processing system 100 of FIG. 1 in accordance with some embodiments. The memory subsystem 200 includes memory modules to store data to be accessed by instructions executing at the CPU 102 and the parallel processor 104. The memory subsystem 200 is organized into a memory hierarchy having system memory 106 at the top of the hierarchy to store all data that can be accessed by the executing instructions, and one or more caches (such as caches 112 shown in FIG. 1) at lower levels of the memory hierarchy to store subsets of the data stored at the system memory 106.

If data required by the CPU 102 or the parallel processor 104 is not found at a cache 112 of the memory hierarchy, a cache controller (not shown) issues a memory access request to a memory controller 212 to retrieve the data from the system memory 106. In the depicted example, the memory subsystem 200 includes the memory controller 212 and a DIMM 215 that includes two ranks of DRAMs, rank-0 220 and rank-1 230. Rank-0 220 includes DRAM-0 221, DRAM-1 222, DRAM-2 223, and DRAM-N 224. Rank-1 230 includes DRAM-0 231, DRAM-1 232, DRAM-2 233, and DRAM-N 234. Each DRAM includes a plurality of banks that can be accessed in parallel, such as bank-N 240, which in turn includes rows and columns of memory cells in which each row/column address pair uniquely identifies a 4-bit word in the DRAM. In some embodiments, the memory controller 212 controls more than two ranks of DRAMs.

In the illustrated example, the memory subsystem 200 is protected by an error detection and correction code (ECC) that stores several additional check bits (not shown) along with each data word. The check bits are encoded to allow detection of certain errors in the data and check bits. For some errors, the ECC identifies the specific data bits in error, allowing the patrol scrubber 122 to correct the data. ECC detection and correction is performed on every read access to DRAM as well as during scrubbing by the patrol scrubber 122.

In addition, to facilitate enhanced page retirement for multi-page faults, the page retirement policy 124 employs control logic circuitry 210 to preemptively identify additional pages of DRAM for potential retirement in response to the patrol scrubber 122 or the memory controller 212 encountering a DUE at a first page of DRAM. In some embodiments, the control logic circuitry 210 is included in the IOMMU 118 or the device driver 116.

Figure 3:
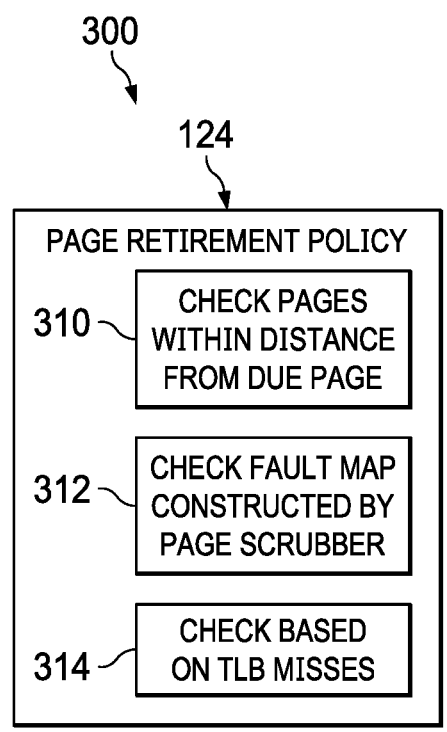
FIG. 3 is a block diagram of a page retirement policy for preemptively identifying pages of memory for retirement based on detected faults in other pages of memory in accordance with some embodiments.

FIG. 3 is a block diagram 300 of the page retirement policy 124 for preemptively identifying pages of memory for retirement based on detected faults in one or more other pages of memory in accordance with some embodiments. In the illustrated example, the page retirement policy 124 includes three instruction sets for preemptively identifying pages of memory for retirement. Instruction set 310 specifies checking pages within a physical distance from a page identified as containing a DUE. Thus, in response to encountering a DUE at a first page, instruction set 310 identifies additional DRAM pages for potential retirement by instructing the control logic circuitry 210 to have the patrol scrubber 122 scrub memory pages located within a predetermined distance from the first page to determine whether the memory pages also contain a DUE.

In some embodiments, the patrol scrubber 122 or memory controller 212 encounters a DUE at a first page X. The patrol scrubber 122 or memory controller 212 retires the first page X and swaps with page H by transferring the data that was stored at first page X into page H. The control logic circuitry 210 then identifies neighboring pages Q-W and Y-Z that are adjacent to the first page X in the physical DRAM space and has the patrol scrubber 122 scrub pages Q-W and Y-Z. In response to encountering a DUE at any of pages Q-W and Y-Z, the patrol scrubber 122 retires the corresponding page and swaps in a corresponding page from the range of pages A-J. If the patrol scrubber 122 does not encounter a DUE at any of pages Q-W and Y-Z, in some embodiments, the page scrubber copies data from pages Q-W and Y-Z to pages A-G and I-J. The instruction set 310 of the page retirement policy 124 specifies the size of the range Q-Z, which is arbitrarily large or small based on the granularity of DRAM faults (e.g., bank fault, row fault, etc.) the page retirement policy 124 is programmed to address.

Instruction set 312 specifies checking a fault map constructed by the patrol scrubber 122 to identify additional DRAM pages for potential retirement. The patrol scrubber 122 checks for errors across the memory subsystem 200 over the course of a scrub interval. In response to detecting a DUE at a specific page address, the patrol scrubber 122 records the page address in a data structure (not shown) such as a hash table, referred to herein as a fault map. In some embodiments, the patrol scrubber 122 updates the fault map every scrub interval so that any new faults observed are recorded and any pages already retired (i.e., offlined) can be removed from the fault map.

In some embodiments, instruction set 312 specifies that in response to encountering a DUE at a first page X, the patrol scrubber 122 is to consult the fault map to determine whether any neighbors of the first page X (i.e., pages having physical addresses within a specified distance of the first page X) have been recorded in the fault map. In some embodiments, the patrol scrubber 122 checks for neighbors of the first page X by scanning the fault map for adjacent page addresses. In other embodiments, the patrol scrubber 122 organizes the fault map to track the beginning and end of pages that are adjacent and found to have a DUE during a scrub interval. If the patrol scrubber 122 finds one or more neighbors of the first page X at the fault map, the patrol scrubber 122 swaps the neighboring pages with pages reserved for replacement of retired pages.

Instruction set 314 specifies identifying additional DRAM pages for potential retirement based on TLB 120 misses. Instruction set 314 predicts which pages tend to miss in the cache—and will therefore likely be accessed from system memory 106—based on misses at the TLB 120. Instruction set 314 instructs the control logic circuitry 210 to have the patrol scrubber 122 scrub the pages that are predicted to miss. If a page that is predicted to miss in the cache 112 is determined to have a DUE, the control logic circuitry 210 retires the page, because the page is predicted to be accessed again. In some embodiments, the instruction set 314 instructs the control logic circuitry 210 to identify multiple adjacent pages that are part of a "miss set". If the patrol scrubber 122 encounters a DUE on one page of the pages in the miss set, the control logic circuitry 210 retires all of the pages in the miss set.

The page retirement policy 124 determines which instruction set 310, 312, 314 to use based on implementation and reliability, availability and serviceability (RAS) requirements of the processing system 100. For example, in some embodiments instruction set 310 immediately retires a page with a transient or intermittent fault, whereas instruction set 312 does not. The fault map approach specified by instruction set 312 allows for flexibility in choosing how many pages are retired based on the address ranges tracked in the fault map whereas the fixed policy of instruction set 310 does not.

Figure 4:
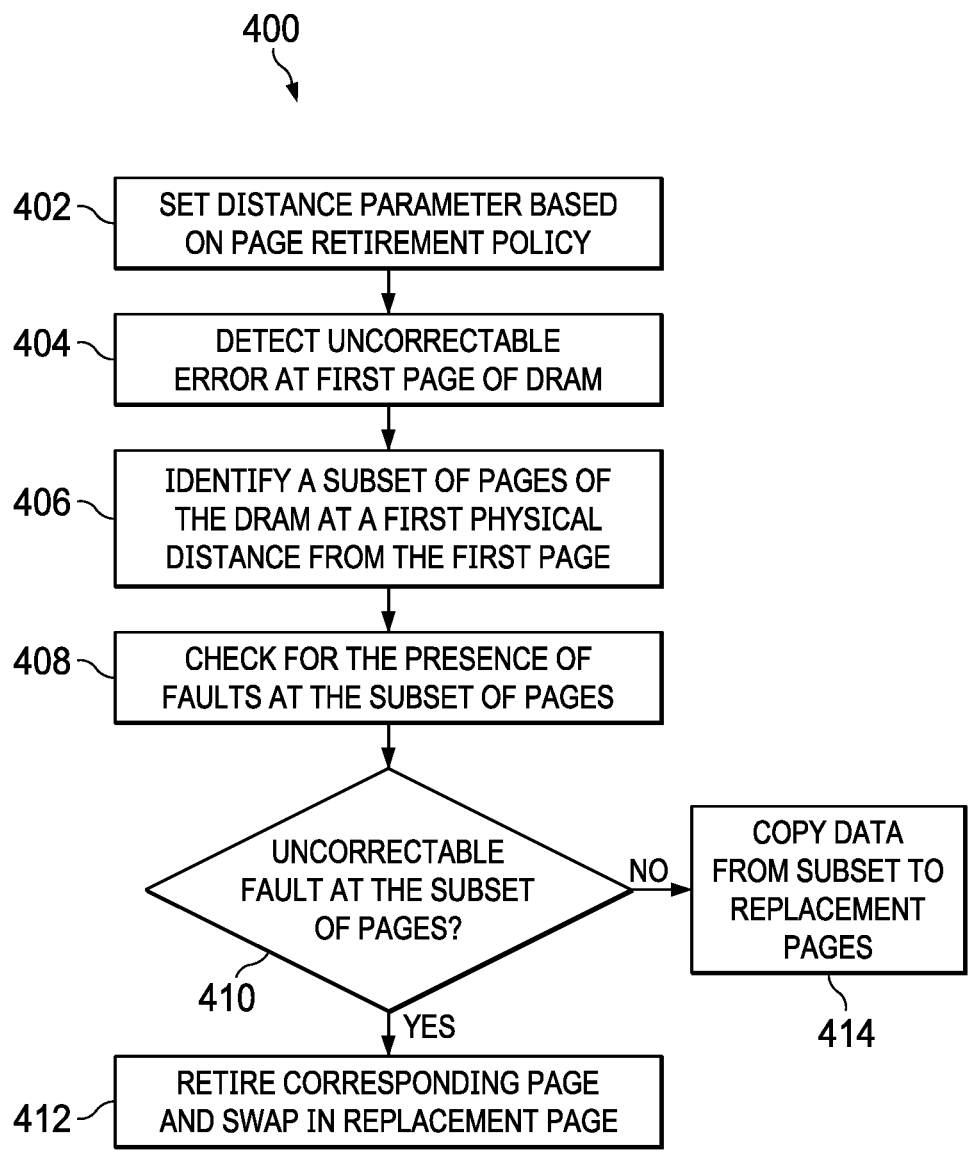
FIG. 4 is a flow diagram illustrating a method of identifying faults at a subset of pages of a DRAM based on detection of an uncorrectable error at a first page of the DRAM in accordance with some embodiments.

FIG. 4 is a flow diagram illustrating a method 400 of identifying faults at a subset of pages of a DRAM based on detection of an uncorrectable error at a first page of the DRAM in accordance with some embodiments. At block 402, the page retirement policy 124 sets a physical distance from a page found to have a DUE (a distance parameter) for a page to be considered a "neighbor" of the page found to have the DUE. At block 404, the patrol scrubber 122 or memory controller 212 detects an uncorrectable error at the first page of DRAM. At block 406, the control logic circuitry 210 identifies a subset of pages of DRAM at the physical distance set by the page retirement policy 124. At block 408, the control logic circuitry 210 has the patrol scrubber 122 check the subset of pages of DRAM for the presence of faults.

At block 410, the patrol scrubber 122 determines if there is a DUE at any of the pages in the subset of pages. If, at block 410, the patrol scrubber 122 determines that there is a DUE at one or more of the pages in the subset, the method flow continues to block 412. At block 412, the patrol scrubber 122 retires the affected page(s) and swaps in replacement page(s) from the DRAM. If, at block 410, the patrol scrubber 122 determines that there is not a DUE at one or more of the pages in the subset, the method flow continues to block 414. At block 414, the patrol scrubber 122 copies data from the subset of pages to replacement pages.

Figure 5:
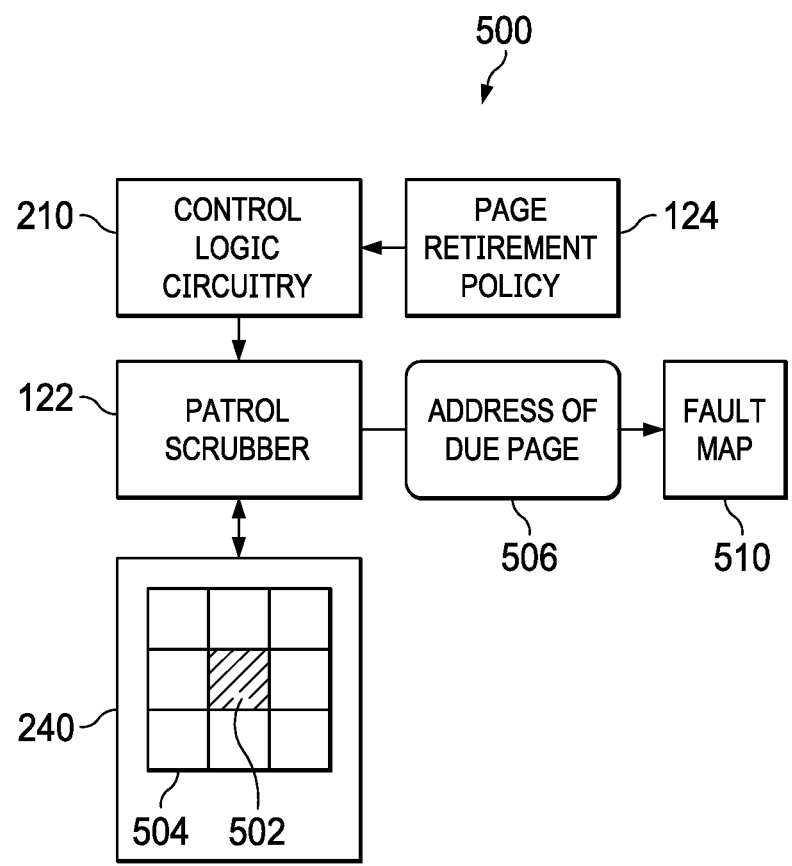
FIG. 5 is a block diagram of a patrol scrubber identifying faults at a subset of pages of a DRAM based on a fault map storing addresses of pages having detected uncorrectable errors in accordance with some embodiments.

FIG. 5 is a block diagram 500 of the patrol scrubber 122 identifying faults at a subset of pages of a DRAM, such pages at bank 240 of DRAM-N 234, based on a fault map 510 storing addresses of pages having detected uncorrectable errors in accordance with some embodiments. According to instruction set 312 of the page retirement policy 124, the control logic circuitry 210 instantiates the patrol scrubber 122 to maintain a fault map 510 including the addresses of pages determined to contain either correctable or uncorrectable faults. In response to encountering a DUE at a page 502 of DRAM-0 231, the patrol scrubber 122 stores the address 506 of the page 502 containing the DUE at the fault map 510.

The patrol scrubber 122 further consults the fault map 510 to determine whether any neighbors such as a page 504 having a physical address within a predetermined distance of the page 502 have been recorded in the fault map 510. The predetermined distance is set by the page retirement policy 124 in some embodiments. In some embodiments, the patrol scrubber 122 checks for neighbors of the page 502 by scanning the fault map 510 for adjacent page addresses. In other embodiments, the fault map 510 is organized to track the beginning and end of a range of addresses of pages that are adjacent and found to have a DUE during a scrub interval. If the patrol scrubber 122 finds one or more neighbors of the page 502 at the fault map 510, the patrol scrubber 122 swaps the neighboring pages with pages reserved for replacement of retired pages.

Figure 6:
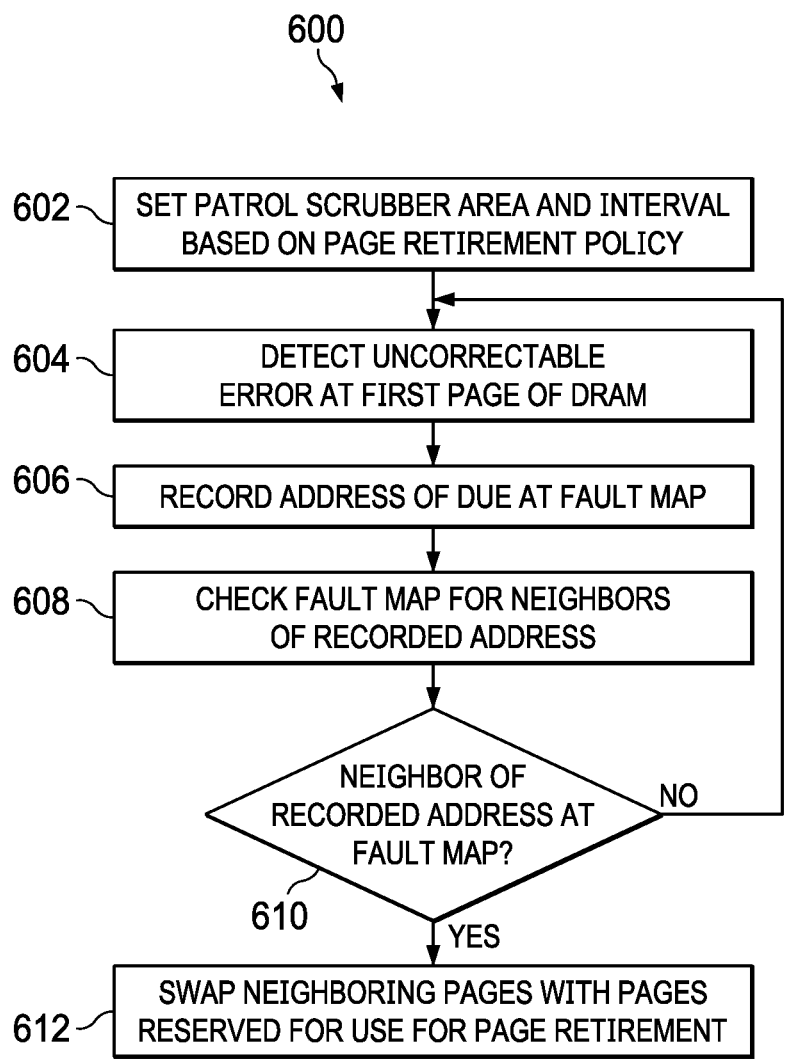
FIG. 6 is a flow diagram illustrating a method of identifying faults at a subset of pages of a DRAM based on a fault map storing addresses of pages having detected uncorrectable errors in accordance with some embodiments.

FIG. 6 is a flow diagram illustrating a method 600 of identifying faults at a subset of pages of a DRAM based on the fault map 510 storing addresses of pages having detected uncorrectable errors in accordance with some embodiments. At block 602, the page retirement policy 124 sets the area that the patrol scrubber 122 is to scrub and the scrub interval. At block 604, the patrol scrubber 122 detects a DUE at a page 502 of DRAM. At block 606, the patrol scrubber 122 records the address of the page 502 at the fault map 510.

At block 608, the patrol scrubber 122 checks the fault map 510 for neighbors of the page 502. The neighbors are identified based on having addresses within a predetermined distance of the page 502, based on the page retirement policy 124. If, at block 610, the patrol scrubber 122 finds neighbors of the page 502 recorded at the fault map 510, the method flow continues to block 612. At block 612, the patrol scrubber 122 swaps the neighboring pages with pages reserved for replacement of retired pages. If, at block 610, the patrol scrubber 122 does not find neighbors of the page 502 at the fault map 510, the method flow continues back to block 604.

Figure 7:
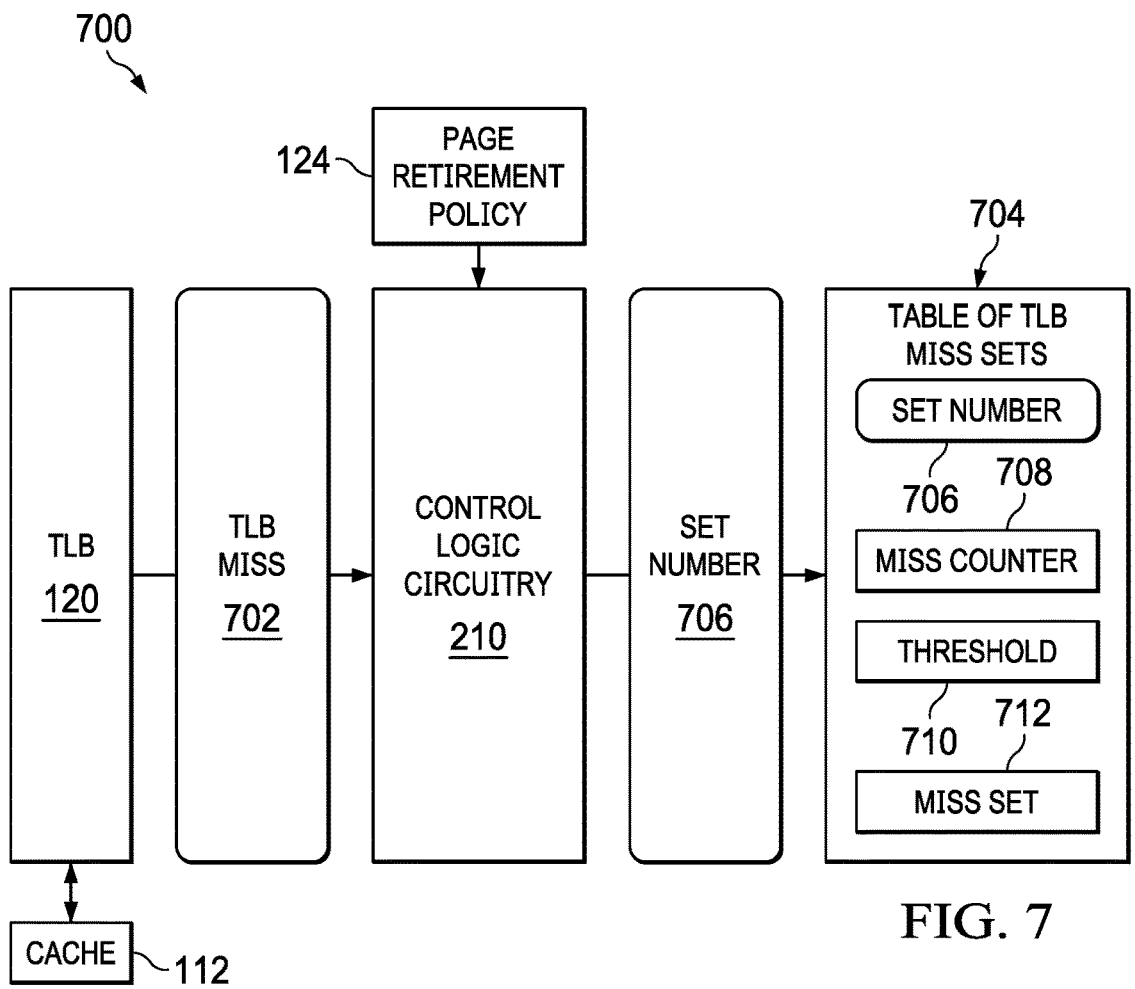
FIG. 7 is a block diagram of control logic circuitry identifying a subset of pages of a DRAM for scrubbing based on misses at a translation lookaside buffer in accordance with some embodiments.

FIG. 7 is a block diagram 700 of the control logic circuitry 210 identifying a subset of pages of DRAM for scrubbing based on misses at the TLB 120 in accordance with some embodiments. As explained above, the TLB 120 stores a subset of virtual to physical address translations stored at the page table 128. A miss at the TLB 120 is predictive of a future miss at the cache 112, which will necessitate an access to the system memory 106. In accordance with instruction set 314, the page retirement policy 124 instructs the control logic circuitry 210 to identify a subset of DRAM pages for scrubbing based on misses at the TLB 120.

The control logic circuitry 210 identifies a cache set, referred to as a "miss set" that is anticipated to have a high number of misses in the near future, which are expected to result in future accesses to system memory 106. In some embodiments, any pages that have the same "set_index+ offset" bit values, as explained below, are considered to be part the "miss set."

Since it is more probable that a miss to the TLB 120 will result in a miss to the cache 112, in response to a miss to the TLB 120, the control logic circuitry 210 begins determining a future miss to a cache set of the cache 112 before finishing the address translation process incurred by the miss at the TLB 120. To predict a future miss to a cache set, the control logic circuitry 210 first determines the index of the set that may have a miss in the near future. In some embodiments, in response to a miss to the TLB 120, the control logic circuitry 210 uses a hash function to decode the page offset of the virtual address and then returns the index of the set. Once the hash function generates the set number 706, the control logic circuitry 210 inserts the set number 706 to a table of TLB miss sets 704. The table of TLB miss sets 704 tracks sets referred by TLB misses. The table of TLB miss sets 704 includes the set number 706 once it has been inserted by the control logic circuitry 210 and a miss counter 708. In some embodiments, the miss counter 708 is a saturating counter that is incremented whenever there is a miss to a set. If the value of miss counter 708 is higher than a threshold 710 for a given set, that set is considered as a "miss set" 712. In some embodiments, the threshold 710 is defined by a programmer.

In some embodiments, the functions of the control logic circuitry are performed by the IOMMU 118. Once the IOMMU 118 receives a TLB miss, the IOMMU 118 uses logic to find the set number that the TLB miss referred to. Then, IOMMU 118 inserts the set number to the table of TLB miss sets 704 and updates the miss counter 708 corresponding to the set. The total number of bits for the miss counter 708 is obtained using a log based on associativity of the cache 112 in some embodiments.

Because only a limited number of sets will be accessed in a specific time interval, the table of TLB miss sets 704 does not need to keep the information of all sets and the size of the table of TLB miss sets 704 can be limited by storing only active sets within the cache 112. In some embodiments, the table of TLB miss sets 704 stores only the total number of sets divided by a number N and uses a direct map cache structure to evict the least recently used line from the table of TLB miss sets 704, where N is a constant number and is defined by the programmer. For example, if the cache 112 is a 2 MB cache with associativity of 16 and a block size of 64B, there will be 2048 sets (11 bits are used to keep a set index in the table of TLB miss sets 704). The miss counter 708 has 4 bits. By assuming N=4 (such that ¼ of the sets are stored in the table of TLB miss sets 704), the size of the table of TLB miss sets 704 will be only 0.94 KB, which is ~0.046% of the size of the cache 112.

Figure 8:
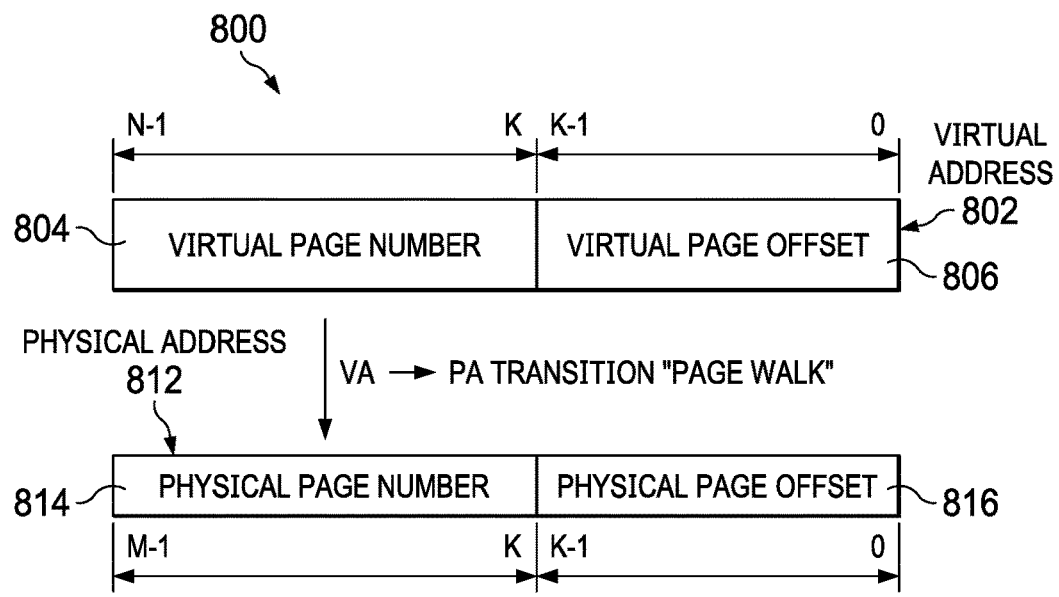
FIG. 8 is a diagram illustrating translation of a virtual address to a physical address for identifying a subset of pages of a DRAM for scrubbing based on misses at a translation lookaside buffer in accordance with some embodiments.
Figure 9:
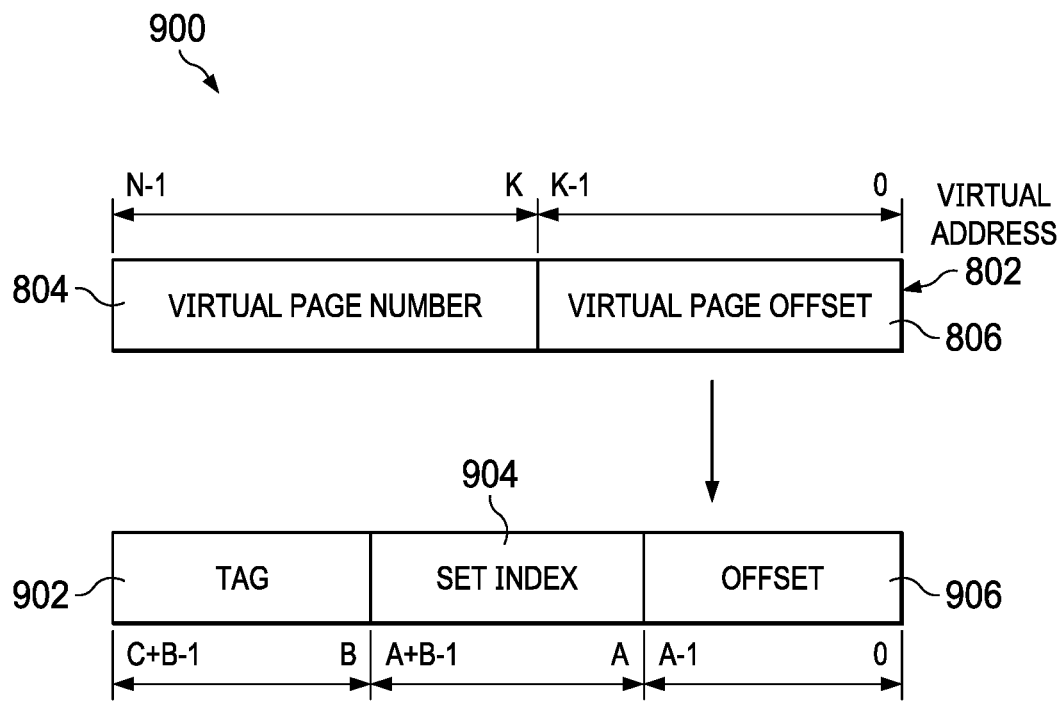
FIG. 9 is a diagram illustrating extraction of a set index from a virtual page offset identifying a subset of pages of a DRAM for scrubbing based on misses at a translation lookaside buffer in accordance with some embodiments.
Figure 10:
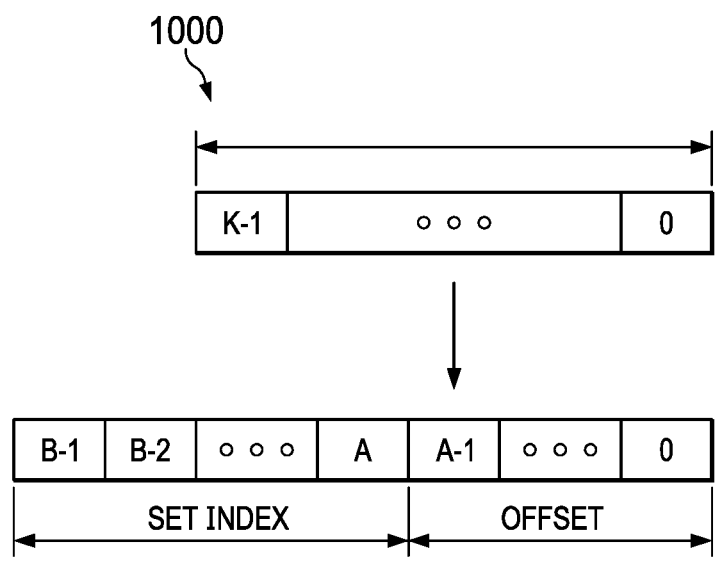
FIG. 10 is a diagram illustrating an example of a set index in which the number of page offset bits is smaller than the total number of bits needed for set index and offset for identifying a subset of pages of a DRAM for scrubbing based on misses at a translation lookaside buffer in accordance with some embodiments.

FIGS. 8-10 illustrate steps for extracting set indices from virtual address. FIG. 8 is a diagram 800 illustrating translation of a virtual address 802 to a physical address 812 for identifying a subset of pages of a DRAM for scrubbing based on misses at the TLB 120 in accordance with some embodiments. The control logic circuitry 210 uses a hash function to determine the cache set number before finishing the address translation process. As illustrated in FIG. 8, during translation of the virtual address 802 to the physical address 812, only a virtual page number 804 is translated to a physical page number 814 and there is no translation of a virtual page offset 806 to a physical page offset 816, because the page offsets 806, 816 are the same for both the virtual address 802 and the physical address 812. The hash function uses only the page offset portion 806 of the virtual address 802 to determine the set number. Generally, the page offset is k bits, which is log (page size).

FIG. 9 is a diagram 900 illustrating extraction of a set index 904 from the virtual page offset 806 to identify a subset of pages of DRAM for scrubbing based on misses at the TLB 120 in accordance with some embodiments. As shown in FIG. 9, in each cache physical address, a, b and c bits are used for byte offset 906, set index 904 and tag 902, respectively. If a+b is lower or equal to k, the control logic circuitry 210 can determine the accurate set number. For small-sized caches or those with higher associativity and fewer number of sets, the value of k is usually equal to or higher than a+b. However, for those cases in which the value of a+b is higher than k, the hash function will return a group of set indices.

FIG. 10 is a diagram 1000 illustrating an example of a set index in which the number of page offset bits is smaller than the total number of bits needed for set index and offset for identifying a subset of pages of a DRAM for scrubbing based on misses at a translation lookaside buffer in accordance with some embodiments. For example, if (a+b)−k=2, as shown in FIG. 10, there are two bits with values that are unknown until the virtual to physical address translation is completed. In this case, the control logic circuitry 210 considers all four possibilities of set numbers, inserts all four possibilities into the table of TLB miss sets 704, and increments their corresponding miss counters 708. Once the pages of a miss set 712 have been identified, the control logic circuitry 210 tasks the patrol scrubber 122 with scrubbing the pages of the miss set 712 to determine if the pages contain any faults. If the patrol scrubber 122 encounters a DUE at any of the pages of the miss set 712, the patrol scrubber 122 retires all the pages of the miss set 712.

Figure 11:
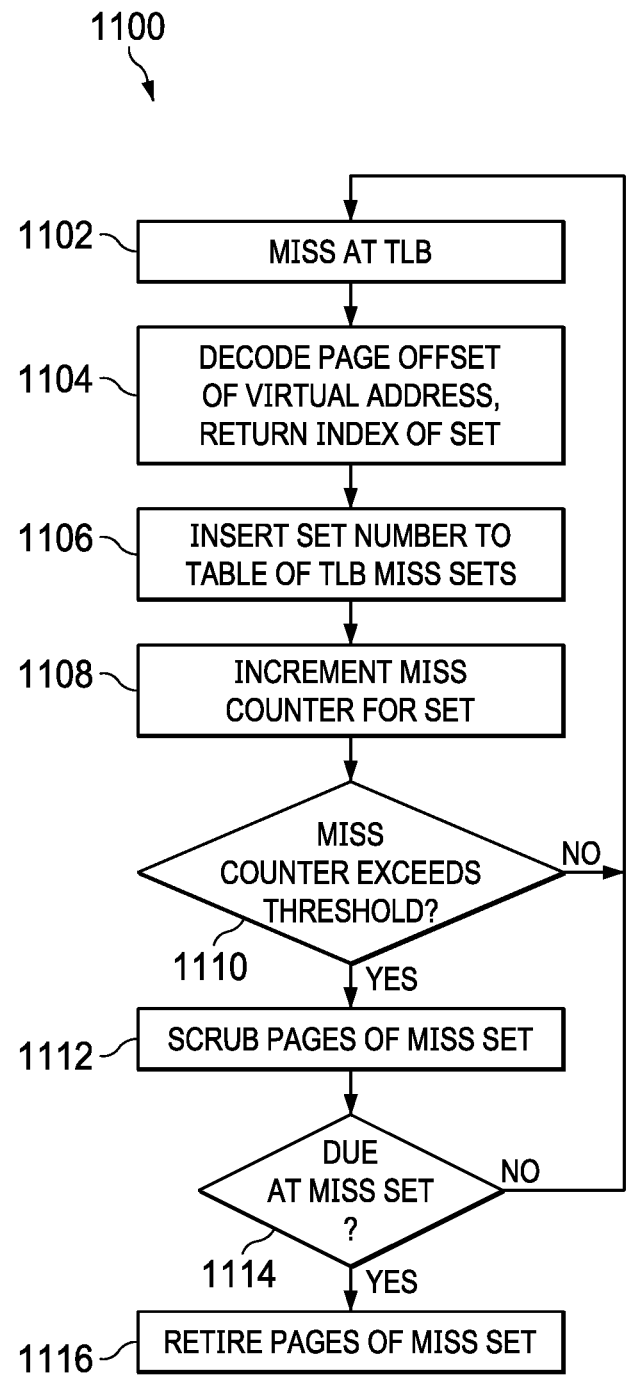
FIG. 11 is a flow diagram illustrating a method of identifying a subset of pages of a DRAM for scrubbing based on misses at a translation lookaside buffer in accordance with some embodiments.

FIG. 11 is a flow diagram illustrating a method 1100 of identifying a subset of pages of a DRAM for scrubbing based on misses at the TLB 120 in accordance with some embodiments. At block 1102, the control logic circuitry 210 identifies a miss at the TLB 120. At block 1104, the control logic circuitry 210 decodes the page offset of the virtual address 802 of the miss and returns the index of the set. At block 1106, the control logic circuitry 210 inserts the set number 706 to the table of TLB miss sets 704, and at block 1108, the control logic circuitry 210 increments the miss counter 708 for the miss set 712. At block 1110, the control logic circuitry 210 determines if the miss counter 708 for the miss set 712 exceeds the threshold 710. If, at block 1110, the control logic circuitry 210 determines that the miss counter 708 does not exceed the threshold 710, the method flow continues back to block 1102.

If, at block 1110, the control logic circuitry 210 determines that the miss counter 708 exceeds the threshold 710, the method flow continues to block 1112. At block 1112, the patrol scrubber 122 scrubs the pages of the miss set 712. At block 1114, the patrol scrubber 122 determines if there is a DUE at any of the pages of the miss set 712. If, at block 1114, the patrol scrubber 122 determines that there is not a DUE at one or more of the pages of the miss set 712, the method flow continues back to block 1102.

If, at block 1114, the patrol scrubber 122 determines that there is a DUE at one or more of the pages of the miss set 712, the method flow continues to block 1116. At block 1116, the patrol scrubber 122 retires all of the pages of the miss set 712.

In some embodiments, the apparatus and techniques described above are implemented in a system including one or more integrated circuit (IC) devices (also referred to as integrated circuit packages or microchips), such as the processing system described above with reference to FIGS. 1-11. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   scrubbing a set of adjacent pages of a dynamic random access memory (DRAM) based on a miss at a translation lookaside buffer (TLB) of a page of the set; and
   in response to detecting an uncorrectable error at a first page of the set, retiring a second page of the set.

2. The method of claim 1, further comprising:
   in response to the miss at the TLB, decoding a page offset of a virtual address of the miss at the TLB and returning an index of the set.

3. The method of claim 2, wherein the decoding is by a hash function generating a set number to be inserted to a table of TLB miss sets.

4. The method of claim 3, further comprising:
   incrementing a counter in response to a miss to the set.

5. The method of claim 1, further comprising:
   recording the uncorrectable error detected at the first page at a fault map comprising a plurality of page addresses of pages having faults.

6. The method of claim 5, further comprising:
   scanning the fault map for page addresses adjacent to the first page in response to recording the uncorrectable error at the first page at the fault map.

7. The method of claim 6, further comprising:
   selecting a subset of page addresses for retirement based on the presence of an uncorrectable error at one or more pages of the subset, the subset including a page address of the second page.

8. The method of claim 4, further comprising:
   retiring the set of adjacent pages in response to the counter exceeding a threshold and detecting an uncorrectable error at the second page.

9. A non-transitory computer-readable medium embodying a set of executable instructions, the set of executable instructions to manipulate at least one processor to:
   scrub a set of adjacent pages of a dynamic random access memory (DRAM) based on a miss at a translation lookaside buffer (TLB) of a page of the set; and
   retire a first page of the set, prior to accessing the first page in response to detecting an uncorrectable error at a second page of the set.

10. The computer-readable medium of claim 9, wherein the set of executable instructions is to manipulate the processor to:
    in response to the miss at the TLB, decode a page offset of a virtual address of the miss at the TLB and return an index of the set.

11. The computer-readable medium of claim 10,
    wherein the decoding is by a hash function generating a set number to be inserted to a table of TLB miss sets.

12. The computer-readable medium of claim 11, wherein the set of executable instructions is to manipulate the processor to:
    increment a counter in response to a miss to the set.

13. The computer-readable medium of claim 9, wherein the set of executable instructions is to manipulate the processor to:
    record the uncorrectable error detected at the second page at a fault map comprising a plurality of page addresses of pages having faults.

14. The computer-readable medium of claim 13, wherein the set of executable instructions is to manipulate the processor to:
    scan the fault map for page addresses adjacent to the second page in response to recording the uncorrectable error at the second page at the fault map.

15. The computer-readable medium of claim 14, wherein the set of executable instructions is to manipulate the processor to:
    select a subset of page addresses for retirement based on the presence of an uncorrectable error at one or more pages of the subset, the subset including a page address of the first page.

16. The computer-readable medium of claim 12, wherein the set of executable instructions is to manipulate the processor to:

retire the set of adjacent pages in response to the counter exceeding a threshold and detecting an uncorrectable error at the first page.

17. A device, comprising:
a dynamic random access memory (DRAM); and
control logic circuitry configured to:
scrub a set of adjacent pages of the DRAM based on a miss at a translation lookaside buffer (TLB) of a page of the set, and
in response to detecting an uncorrectable error at a first page of the set, retire a second page of the set.

18. The device of claim 17, wherein the control logic circuitry is further to:
in response to the miss at the TLB, decode a page offset of a virtual address of the miss at the TLB and returning an index of the set.

19. The device of claim 18, wherein the control logic circuitry is further to:
decode the page offset using a hash function to generate a set number to be inserted to a table of TLB miss sets.

20. The device of claim 19, wherein the control logic circuitry is further to:
increment a counter in response to a miss to the set; and
retire the set of adjacent pages in response to the counter exceeding a threshold and detecting an uncorrectable error at the second page.

* * * * *